United States Patent [19]

Hanzawa et al.

[11] Patent Number: 5,390,270
[45] Date of Patent: Feb. 14, 1995

[54] OPTICAL FIBER FERRULE ASSEMBLIES

[75] Inventors: Hideyuki Hanzawa, Tokyo; Toshihiro Nonaka, Machida, both of Japan

[73] Assignee: Kel Corporation, Tokyo, Japan

[21] Appl. No.: 139,046

[22] Filed: Aug. 16, 1993

Related U.S. Application Data

[63] Continuation-in-part of Ser. No. 931,219, Aug. 17, 1992, abandoned, which is a continuation-in-part of Ser. No. 617,990, Nov. 26, 1990, Pat. No. 5,231,685.

[30] Foreign Application Priority Data

| | | | |
|---|---|---|---|
| Aug. 16, 1991 | [JP] | Japan | 3-229613 |
| Sep. 3, 1991 | [JP] | Japan | 3-252967 |
| Sep. 28, 1992 | [JP] | Japan | 4-282363 |

[51] Int. Cl.⁶ .................. G02B 6/36; G02B 6/38
[52] U.S. Cl. .................... 385/81; 385/62;
385/65; 385/66; 385/78; 385/84; 385/83;
385/136; 385/137; 385/139
[58] Field of Search ............ 385/60, 62, 65, 66,
385/70, 72, 76, 78, 81, 83, 84, 87, 88, 89, 139, 136, 137

[56] References Cited

U.S. PATENT DOCUMENTS

| | | | |
|---|---|---|---|
| 4,101,198 | 7/1978 | Heldt | 385/81 X |
| 4,355,862 | 10/1982 | Kock | 385/81 X |
| 4,418,983 | 12/1983 | Bowen et al. | 385/62 X |
| 4,674,833 | 6/1987 | Des Forges | 385/81 X |
| 4,679,895 | 7/1987 | Huber | 385/81 X |
| 4,696,537 | 9/1987 | Bauer et al. | 385/87 X |
| 4,705,352 | 11/1987 | Margolin et al. | 385/81 X |
| 4,728,171 | 3/1988 | Schofield et al. | 385/81 X |
| 4,815,810 | 3/1989 | Betzler et al. | 385/81 X |
| 4,824,203 | 4/1989 | Kunze et al. | 385/81 X |
| 5,080,460 | 1/1992 | Erdman et al. | 385/81 |
| 5,107,536 | 4/1992 | Wall | 385/81 |
| 5,185,837 | 2/1993 | Ayuta et al. | 385/81 |
| 5,202,942 | 4/1993 | Collins et al. | 385/87 |
| 5,231,685 | 7/1993 | Hanzawa et al. | 385/84 |

*Primary Examiner*—Brian Healy
*Attorney, Agent, or Firm*—Robert W. J. Usher

[57] ABSTRACT

An inner, optical fiber core clamping ferrule has an optical fiber clamping portion for receipt in an outer ferrule and defining an axially extending through-passageway, an axial slit extending through the clamping portion divides the passageway into two opposed groove portions receiving a prepared end of an optical fiber extending along the through-passageway. The inner ferrule is force-fitted in the outer ferrule to extend co-axially therewith, with wall portions thereof maintaining the opposed walls of the spaced apart slit in open condition so that opposed walls of the groove portions are pressed into gripping engagement with the optical fiber. The opposed walls of the slit diverge as they extend radially outwardly away from the groove portions. The inner ferrule may be split for the entire length of the through passageway forming two halve hinged together at one end or have open slits formed in an otherwise imperforate tubular wall.

29 Claims, 11 Drawing Sheets

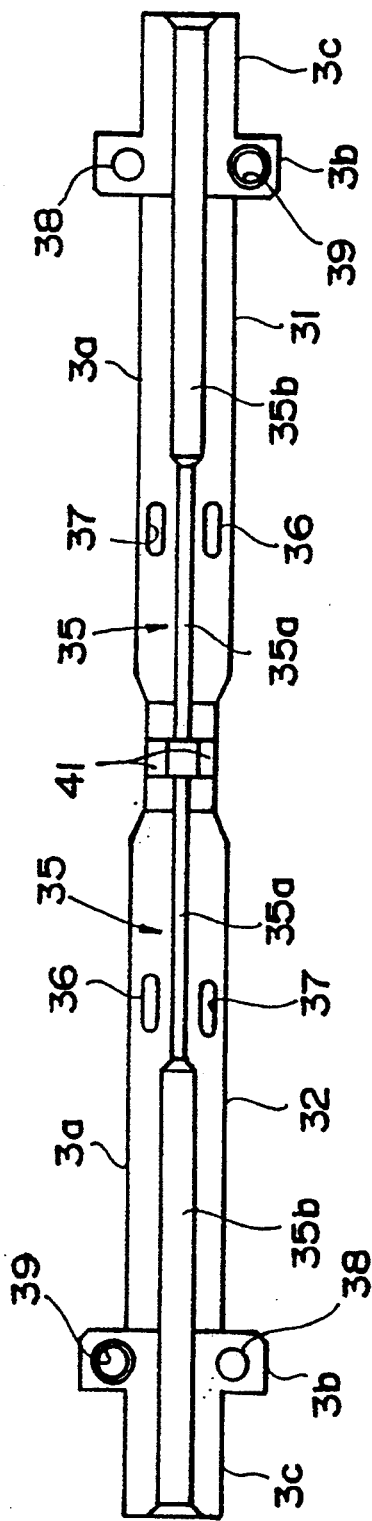
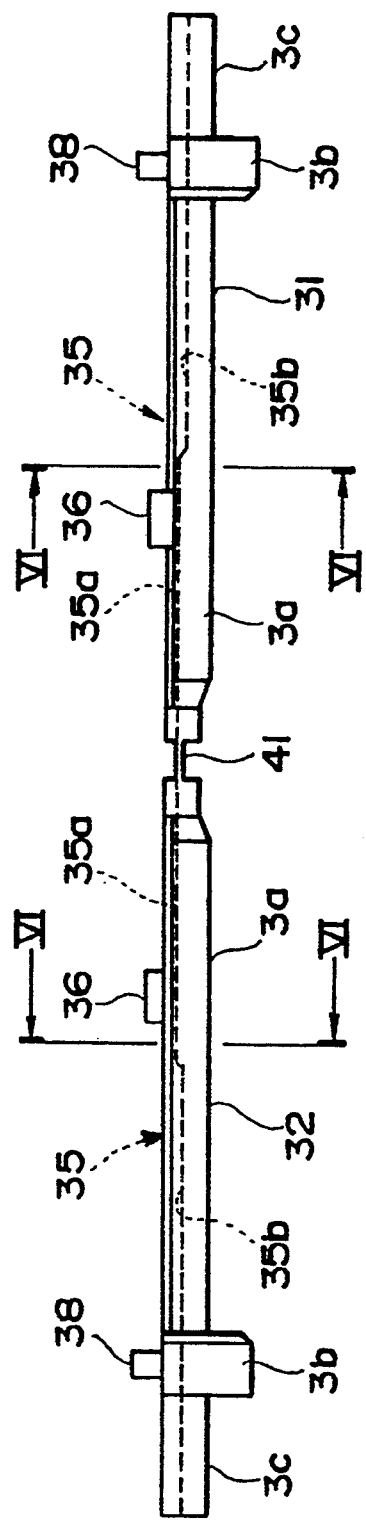
Fig. 4
Fig. 5

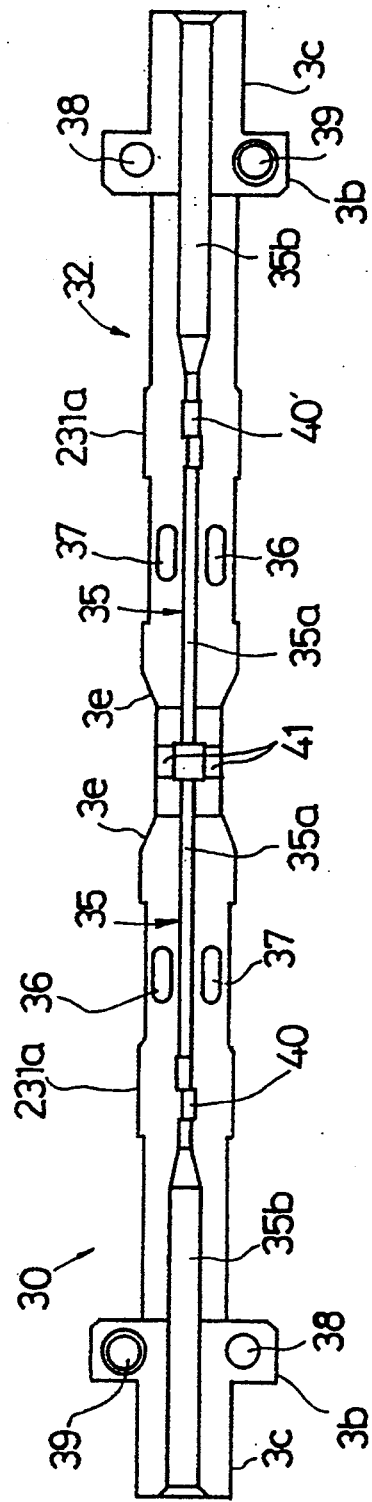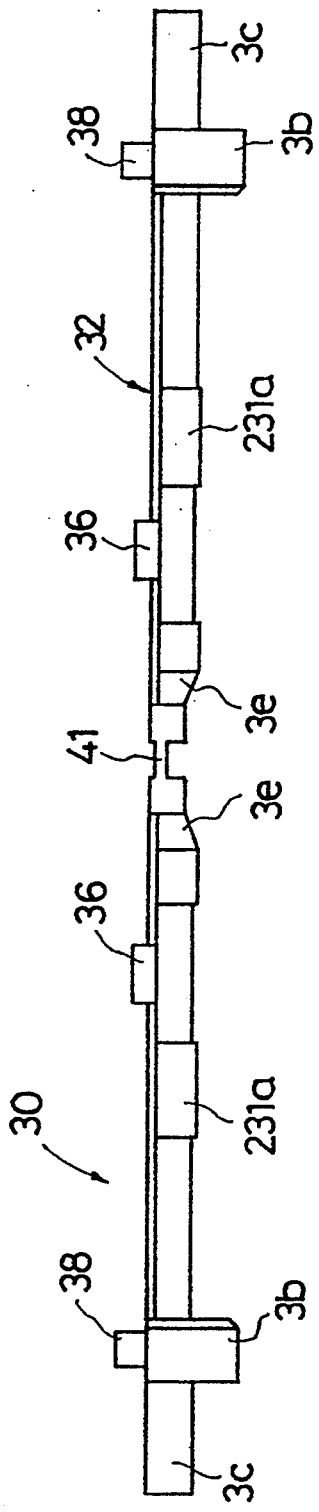

OPTICAL FIBER FERRULE ASSEMBLIES

This is a continuation-in-part application of Ser. No. 07/931219, filed Aug. 17, 1992, now abandoned, which is a continuation-in-part application of Ser. No. 07/617990 filed Nov. 26, 1990 issued as U.S. Pat. No. 5,231,685 on Jul. 27, 1993.

FIELD OF THE INVENTION

The invention relates to ferrule assemblies for terminating optical fibers for use, particularly in optical plug connectors, for example, multi-way, optical fiber plug connectors of the general type described in parent application Ser. No. 07/617,990, now U.S. Pat. No. 5,231,685.

BACKGROUND OF THE INVENTION

In connectors for optical fibers for data transmission, ends of the respective optical fibers to be connected are inserted or terminated in ferrules brought into engagement with each other with the respective end surfaces of the optical surfaces contacting each other and in precise axial alignment.

As discussed in the parent application, a known technique for retaining the optical fiber securely in the ferrules employs the step of caulking the ferrules, in the radial direction, including the use of adhesives. However, disadvantages of this approach include difficulties in applying the correct amount of caulk and, therefore, the correct force, with the risk that the optical fiber is deformed and slips out of the ferrule easily, while performing the caulking by hand requires time consuming manipulation. Considerable time is also required to permit the adhesive to harden, resulting in poor productivity and quality control making this approach unsuitable for high volume mass production to meet minimal or zero defect quality standards.

In another approach taught by the parent application and disclosed in the priority Japanese patent application 3-167506, published on Jul. 7, 1991, the disadvantages associated with caulking are obviated by utilization of a ferrule assembly including an outer ferrule and an inner ferrule which clamps the optical fiber when is forced-fitted into the outer ferrule. An axially extending slit is formed through a wall of the inner ferrule to permit the inner ferrule to be deformed radially inwardly taking up the clearance provided by the presence of the slit and providing a compressive force which clamps the optical fiber tightly, retaining it in place in the assembly.

However, it has been found that there is a risk of an uneven clamping force being applied to the optical fiber clamped by the inner ferrule, resulting in instability of retention. In particular, when the inner ferrule is forced into the outer ferrule, there is a risk that opposed surfaces of the slits are brought into engagement with each other by deformation of the inner ferrule, precluding further inward deformation so that sufficient force for holding the optical fiber is then not obtained.

SUMMARY OF THE INVENTION

It is one object of the invention to provide a ferrule assembly for terminating an optical fiber in an optical connector which can be made without a requirement for caulking or adhesives and in which the optical fiber can be assembled and retained in the ferrule in a simple reliable manner.

It is a further object of the invention to provide a ferrule assembly for terminating an optical fiber in a connector which is suitable for high volume mass production at low cost with minimal defects.

According to one aspect of the invention a ferrule assembly for terminating an optical fiber comprises:

an outer ferrule comprising a tubular body wall having front, mating and rear, optical fiber receiving axial ends;

an inner bare optical fiber clamping ferrule comprising a tubular body having a front, axial end and a rearwardly extending optical fiber clamping portion for receipt in the outer ferrule and defining an axially extending through-passageway, an axial slit extending through the clamping portion dividing the passageway into two opposed groove portions so that a prepared end of an optical fiber can be located in the groove portions extending along the through-passageway and the inner ferrule subsequently force-fitted into the outer ferrule to extend co-axially therewith, wall portions of the inner ferrule body at opposite axial ends of the slit maintaining axial portions of opposed surfaces of the slit spaced apart from each other with the slit in open condition so that opposed walls of the groove portions are pressed into gripping engagement with the optical fiber therein by the receipt of the inner ferrule in the outer ferrule retaining the optical fiber centered accurately in the ferrule assembly.

As the opposed surfaces of the slits cannot be brought into engagement by the step of inserting the inner ferrule within the outer ferrule, the entire compressive force produced by such forcible insertion is applied by the surfaces of the groove portions to the optical fiber therein ensuring that the optical fiber is held firmly fixed in the ferrule. This obviates the risk of a sufficient clamping force not being applied to retain the optical fiber securely within the ferrule assembly.

The inner ferrule may be of square or cylindrical cross-section, corresponding to the internal cross-section of the outer ferrule, and, if of cylindrical cross-section, the spaced apart opposed slit surfaces may diverge so that the slit increases in width as it extends away from the grooves portions, providing a fan-shaped, transverse across-section.

The slit may divide the body into a pair of optical fiber clamping halves, each clamping half being formed with one of the groove portions. This provides the advantage of relative ease of manufacture of the ferrule as the clamping halves can be formed by a relatively simple molding technique.

Preferably, the clamping halves are integrally joined together by web hinges extending from the front ends on respective opposite sides of the through-passageway.

The provision of the hinges both enables the ferrule to be to be molded as a single piece and the clamping halves to be located on top of each other by a simple folding step.

Preferably, the accurate location of the clamping halves embracing the fiber prior and during insertion in the outer ferrule is assured by the provision of mating members on respective clamping halves interengageable to accurately locate the halves with the groove portions in precise axial alignment.

According to a further aspect of the invention, the clamping portion is formed with two, axially spaced clamping sections for clamping the bare optical fiber and sheath, respectively, and being of increased diameter providing radially outwardly protruding interference portions forming interference fits within the outer ferrule and in which there are two said slits and maintaining wall portions located in longitudinally spaced apart relation extending through opposite sides of the clamping portion in respective clamping sections. This construction further assures the accurate application of a clamping force to the optical fiber at preferred locations.

Preferably, the maintaining wall portions are imperforate.

The last mentioned version provides handling advantages as a requirement to manipulate hinged or loose pieces is obviated, affording easier assembly.

According to an additional aspect of the invention, at least one axially extending, fiber retaining section of a groove portion is non-aligned axially both with a remainder of the groove portion of the clamping portion in which it is formed and with a fiber retaining section of the other groove portion so that the respective axes of the fiber retaining sections are laterally displaced and so that, when opposed walls of the groove portions are pressed into gripping engagement with the optical fiber with the fiber retaining sections in opposed overlying relation, longitudinal edges of the fiber retaining sections of respective groove portions will press opposite sides of optical cladding of the fiber in opposite lateral directions thereby restraining axial movement of the fiber relative to the inner ferrule.

Preferably, the respective axes of the fiber retaining sections are laterally displaced in respective opposite directions from each other to respective opposite sides of the axes of the remainders of groove portions with which they are contiguous. The resulting pressure on the cladding from the axially extending edges of the groove walls deforms the cladding into a somewhat sinuous shape on respective opposite sides of the bare fiber with the curves thereof being 180 degrees out of phase from each other providing a particularly effective retention force to prevent "pistoning" of the bare fiber during thermal expansion and contraction of the inner ferrule.

BRIEF DESCRIPTION OF THE DRAWINGS

Embodiments of the invention will now be described by way of example only and with reference to the accompanying drawings in which:

FIG. 4 is a plan view of the inner ferrule of FIG. 3 in a developed condition;

FIG. 5 is a side elevation of the inner ferrule of FIG. 3 in a developed condition;

FIG. 21A is a plan view of an inner ferrule of another embodiment of the invention in a developed condition;

FIG. 21B is a side elevation of the inner ferrule of FIG. 21A in a developed condition;

DESCRIPTION OF PARTICULAR EMBODIMENTS

Figure 1:
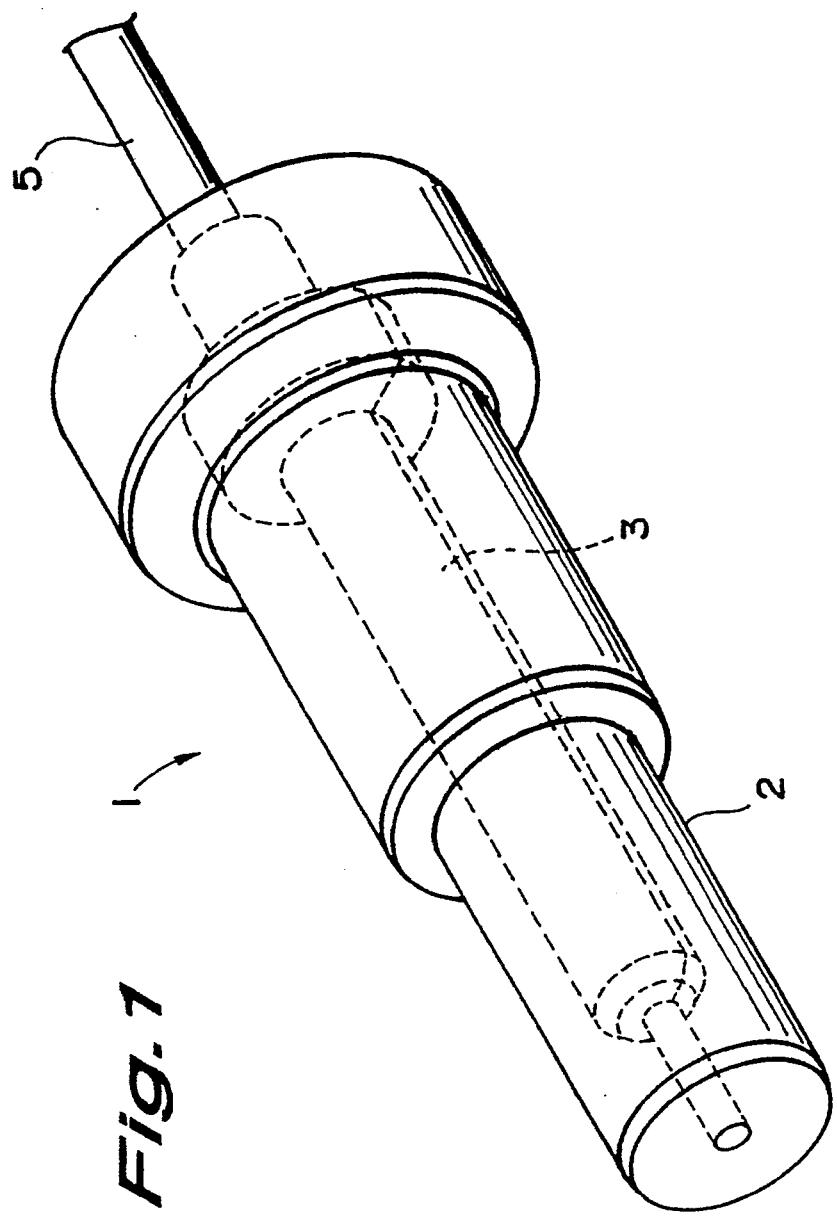
FIG. 1 is a perspective view of an optical connector comprising a ferrule assembly according to a first embodiment of the invention.

As shown in FIG. 1, a first example of ferrule assembly 1 includes an outer ferrule 2 inwardly stepped towards a front end and an inner ferrule 3 retaining an optical fiber 5 and force-fitted into the outer ferrule 2.

Figure 2:
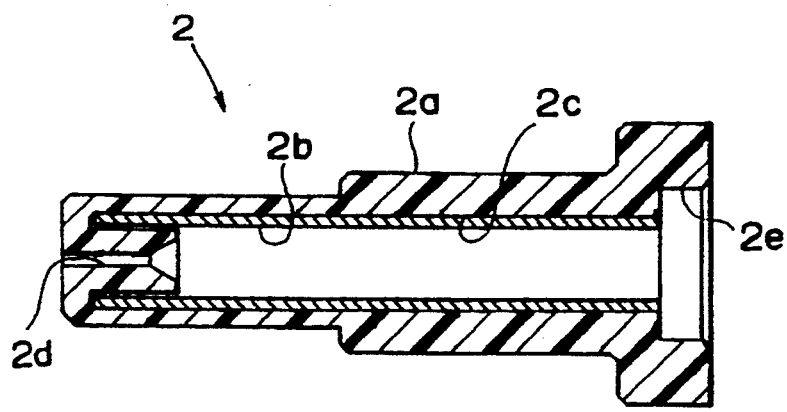
FIG. 2 is a cross-section of a view taken along a longitudinal axis of an outer ferrule of the first example of ferrule assembly.

As shown particularly in FIG. 2, the outer ferrule 2 comprises an outer sleeve 2a molded in one piece from plastic material and a metal tube 2b force-fitted in a bore 2c extending axially through the outer sleeve, the tube 2b having a forward end received in an internal annular groove adjacent the front end of the bore. A bare optical fiber receiving and guiding counter-bore is formed in the front end of the outer ferrule sleeve, centrally of the annular groove and extends axially rearwardly, terminating in a funnel-shaped guide portion. An inner ferrule locating counter-bore 2e of larger diameter than the bore 2c and communicating therewith opens to the rear end.

Figure 3:
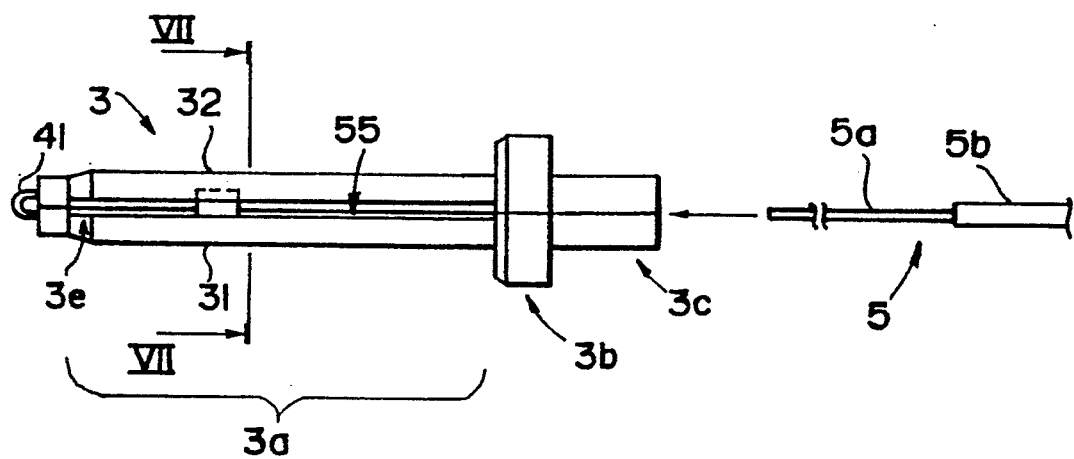
FIG. 3 is a side elevation of an inner ferrule of the first example of ferrule assembly in folded condition and an optical fiber aligned for insertion therein.

As shown particularly in FIG. 3, the inner ferrule 3 is molded in one piece from plastic or synthetic resin and comprises a cylindrical body having front and rear ends and formed with a bare optical fiber clamping portion 3a of small diameter which extends rearwardly from the front end to a locating portion 3b of larger diameter extending to a rear end portion 3c which is also of small diameter. The front end of the body is formed with a forwardly tapering portion 3e. The inner ferrule is effectively divided or split into two clamping halves 31 and 32 by a slit extending along the longitudinal axis and optical fiber receiving grooves 35 extend actually centrally of the respective slit surfaces. Each groove 35 comprises a bare optical fiber receiving section 35a of small width extending rearwardly from the front end and communicating at a medial location with an optical fiber sheath receiving groove section 35b of larger width (diameter). Interengageable, locating lugs or dowels and sockets 36, 38 and 37, 39 are formed on respective slit surfaces of respective clamping halves on respective opposite sides of the bare optical fiber and sheath receiving groove sections 35a and 35b, respectively, the lugs or dowels 38 and the sockets 39 being located on the locating portion 3b. The clamping halves are integrally joined together at front ends by web hinges 41, located on respective opposite sides of the grooves, thereby to avoid interfering with the optical fiber passage.

The inner ferrule 3 can easily be assembled by folding the clamping halves 31 and 32 together along the hinge 41 bringing the respective slit surfaces in face-to-face relation so that the lugs or dowels 36 and 38 are received in respective sockets 37 and 39 assuring that the groove portions 35a and 35b of respective halves are in precise axial alignment to define bare optical fiber and optical fiber sheath receiving passageway sections 52 and 51, respectively.

Figure 6:
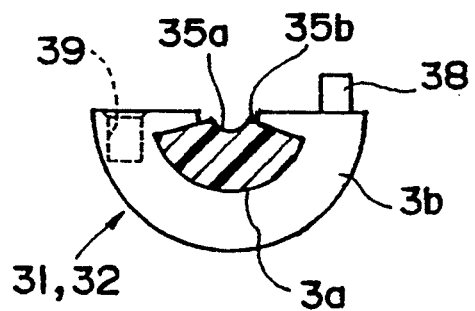
FIG. 6 is a cross-sectional view taken along line 6—6 of FIG. 5.
Figure 7:
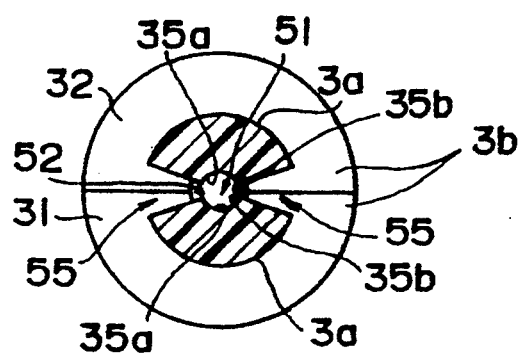
FIG. 7 is a cross-sectional view taken along lines 7—7 of FIG. 3.

As shown in FIG. 6, at locations extending from adjacent the front end of the clamping section 3a to a rear end thereof, the transverse cross-sections of the clamping halves 31 and 32 are of fan-shape, widening to accommodate the smaller, bare fiber receiving groove 35a and the larger, sheath receiving groove 35b so that the slit surfaces on respective opposite sides of the grooves diverge as they extend radially outwardly, away from the respective groove sections. However, the transverse cross-sections of the tapering front end portion, the locating or mounting portion 3b and the end portion 3c are semicircular with the grooves extending centrally thereof. Thus, when the housing halves of the ferrule are assembled together about an optical fiber with the bare optical fiber received in the groove section 35a and the optical fiber portion covered by the sheath in groove section 35b, the surfaces of the slits of the tapering, locating and end portions 3e, 3b and 3c are brought into engagement with each other while the slit surfaces of the major portion of the clamping portion 3a which is of fan-shaped, cross-section are maintained spaced apart from each other i.e., forming open slit portions 55.

When the optical fiber is assembled with the inner ferrule with the sheath part 5a and the bare fiber part 5b received in the passageway 52 and 51, respectively, the surfaces of the groove sections 35a and 35b in the clamping portion 3a engage and grip the optical fiber 5 firmly, while the opposed divergent surfaces of the slits remain in spaced apart condition.

It should be noted that the optical fiber 5 may be assembled with the inner ferrule either by insertion into the inner ferrule in a condition in which the clamping halves 31 and 32 are positioned one on top of the other, as shown in FIG. 3, or by insertion of the optical fiber into a single clamping half, and the other clamping half subsequently pivoted into position thereon by folding the hinge 41.

The optical fiber 5 is held tightly by the clamping halves by using either method.

Figure 8:
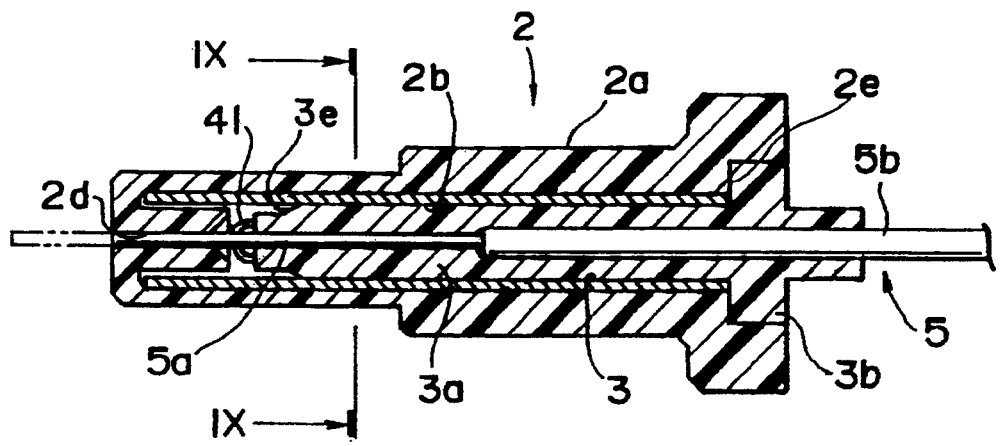
FIG. 8 is a cross-sectional view along a longitudinal axis of the optical connector formed by the ferrule assembly of FIG. 1.

The sub-assembly of the inner ferrule 3 and the optical fiber 5 is force-fitted into a rear, open end of the tube 2b, front end first, to the position shown in FIG. 8, the provision of the tapered portion 3e, facilitating insertion. As the hinges 41 extend only axially from the front end of the inner ferrule, without spreading or protruding laterally from the side of the clamping portion 3a, the hinges do not hinder the insertion step.

Insertion of the inner ferrule is limited by abutment of a front face of the locating or mounting part 3b thereof with a rearwardly facing shoulder formed in the locating or mounting aperture 2e of the outer ferrule sleeve. During insertion, the bare fiber 5a which protrudes from the front end of the inner ferrule is received in the bore 2d of the outer ferrule as a sliding fit, guided therein by the funnel-shaped entry portion and protrudes from a front end of the outer ferrule.

Figure 9:
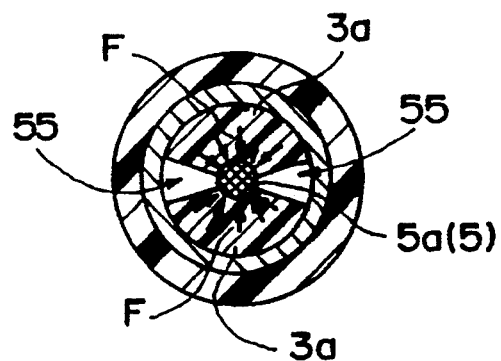
FIG. 9 is a cross-sectional view taken along line 9—9 of FIG. 8.

The surfaces of the slits in the clamping portion 3a remain spaced apart after the subassembly of the inner ferrule and the optical fiber are force-fitted into the outer ferrule. The entire compressive force produced by the force-fit is applied to the surfaces of the groove portions and concentrated on the periphery of the bare optical fiber, as illustrated by the arrows F in FIG. 9. Thus the magnitude of the compressive force can be preselected by chosing suitable values for the inner diameter of the tube 2b and the outer diameter of the inner ferrule 3 to ensure that the optical fiber is neither deformed nor dislodged from the inner ferrule. The pre-selection of these values enables the holding forces or retaining forces of a multiplicity of ferrules, for example, for use in standardised, multiway connectors, to be maintained at constant predetermined levels.

As a final assembly step, the protruding bare optical fiber is severed level with the front end surface of the outer ferrule and polished, as required.

The inner ferrule insertion forces are retained by the metal tube avoiding distortion of the outer plastic ferrule. The provision of the reinforcing tube also enables the holding force of the optical fiber to be regulated and optical fibers having different diameters to be installed by substitution of metal tubes with different wall thicknesses providing different internal diameters in an outer plastic ferrule of constant size.

Figure 10:
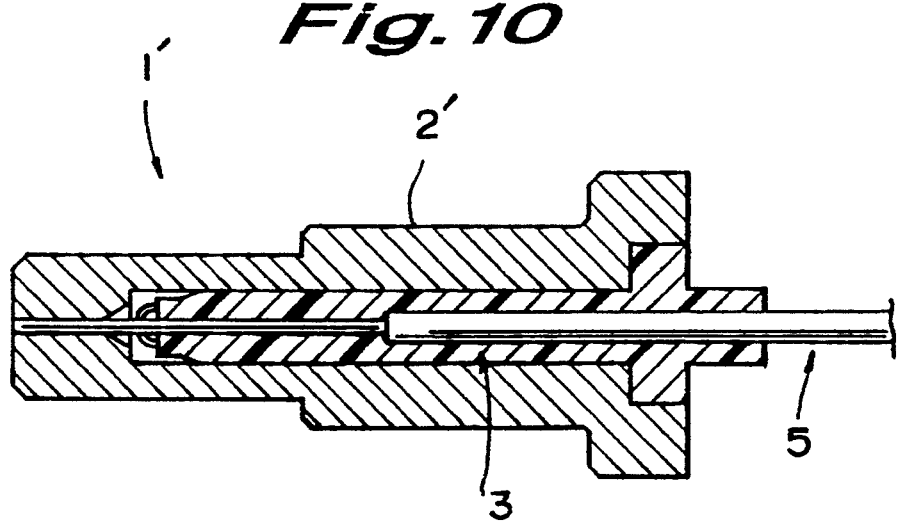
FIG. 10 is a cross-sectional taken along a longitudinal axis of a second example of ferrule assembly forming an optical connector.

In an alternative example, shown in FIG. 10, the outer ferrule 2' is formed integrally in one piece of metal. This has the advantage of obviating the sometimes troublesome operation of forcibly the reinforcing tube 2b into the outer ferrule part 2a, while providing sufficient strength. Although, in the above described example, the inner ferrule 3 is, in effect, split for its entire length, in a modification, only a clamping portion corresponding, for example, to the portion 3a need be so split while the remainder such as the locating 3b and the end portion 3c may have an imperforate body wall.

Furthermore, although shown as cylindrical, the inner ferrule 3 may be formed with a square transverse cross-section in which case the bore of the outer ferrule should be formed with a corresponding cross-sectional shape.

Figure 11:
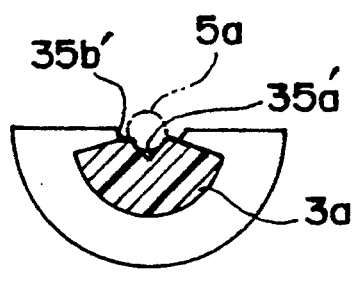
FIG. 11 is a transverse cross-sectional view of another example of inner ferrule.

In another modification, shown in FIG. 11, the optical fiber receiving grooves are not, as in the above example of semicircular form but are of V-section as indicted by references 35a' and 35b'.

Figure 12:
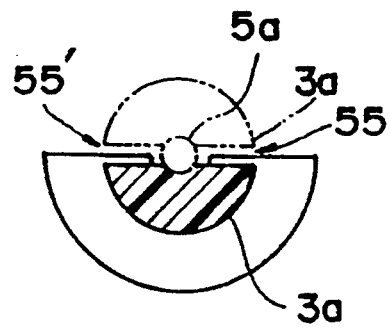
FIG. 12 is a transverse cross-sectional view of another example of inner ferrule.

In a further modification, shown in FIG. 12, the opposed slit surfaces of the clamping portion or section 3a are not divergent but parallel, defining parallel walled, open slits 55'.

In another modification, the clamping halves corresponding to those indicated by 41 and 32, above, are formed separately and the hinge 41 is omitted.

Figure 13:
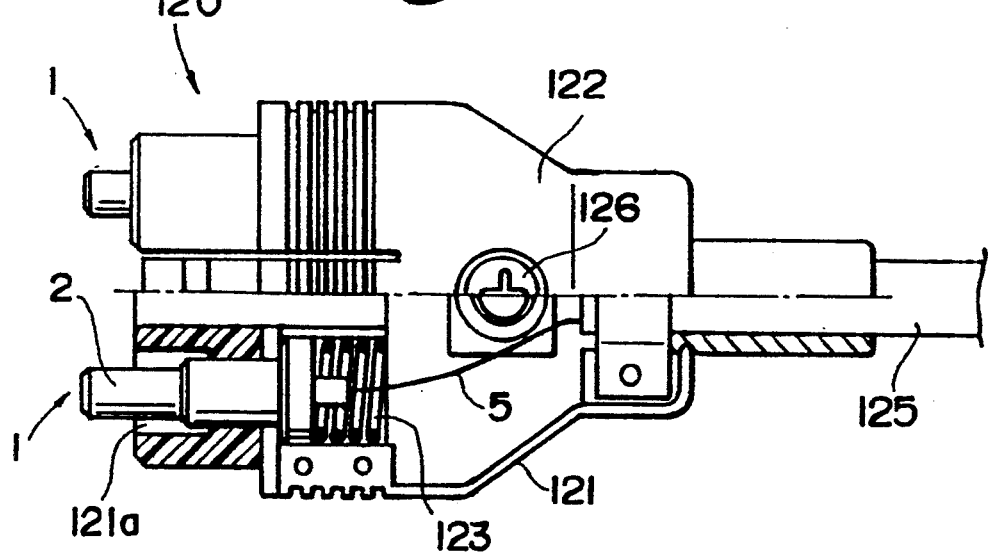
FIG. 13 is a plan view, partly in cross-section of a two-way connector incorporating ferrule assemblies according to the invention.
Figure 14:
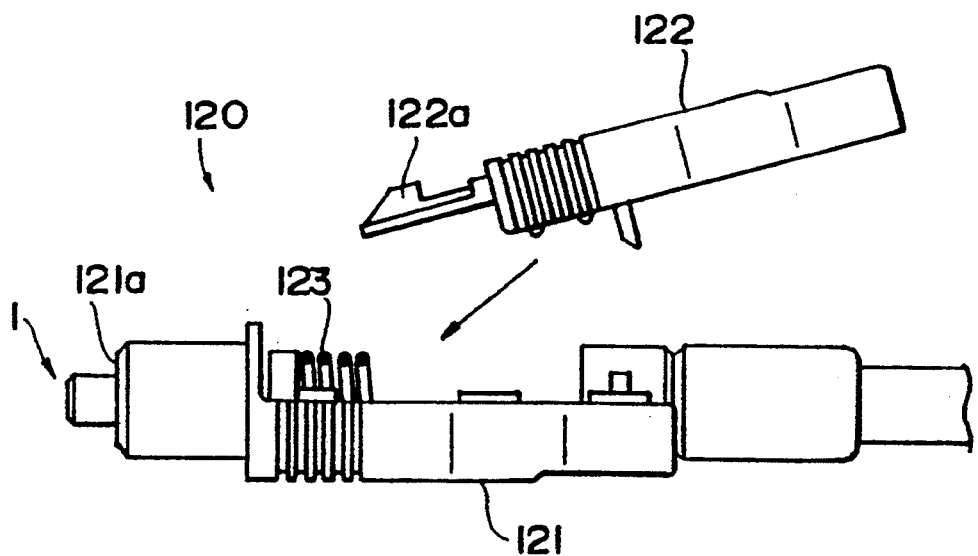
FIG. 14 is a side elevation of the connector of FIG. 13 at a stage in assembly thereof.
Figure 15:
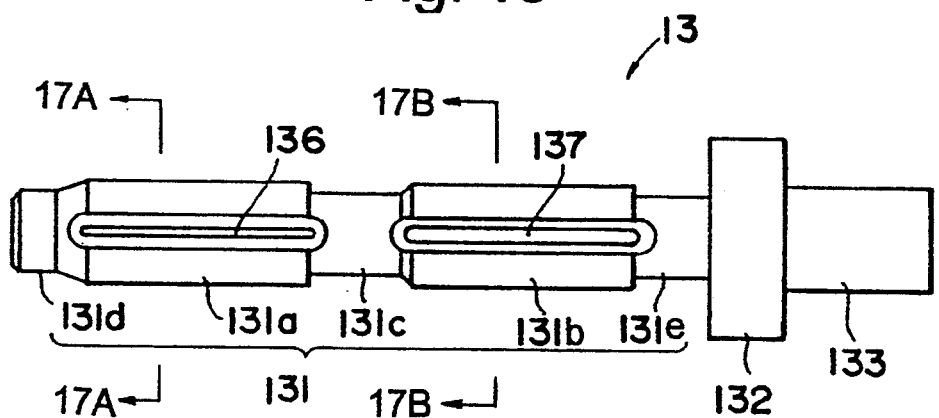
FIG. 15 is a side elevation of an inner ferrule according to another example.
Figure 16:
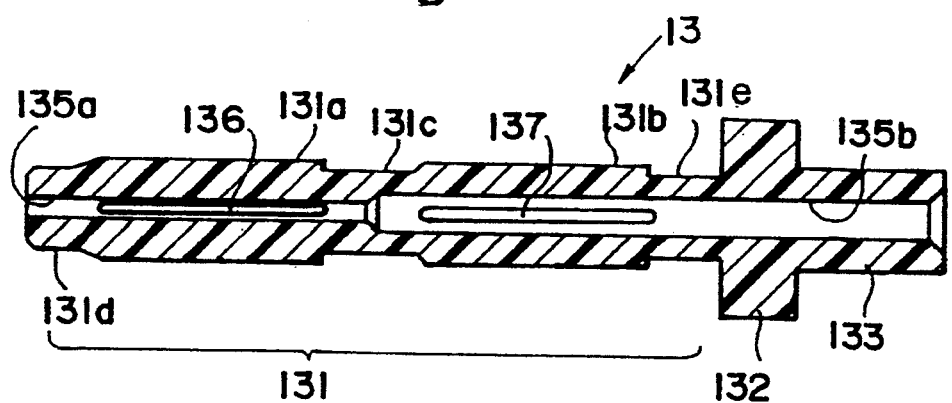
FIG. 16 is a cross-sectional view taken along a longitudinal axis of FIG. 15.
Figure 17A:
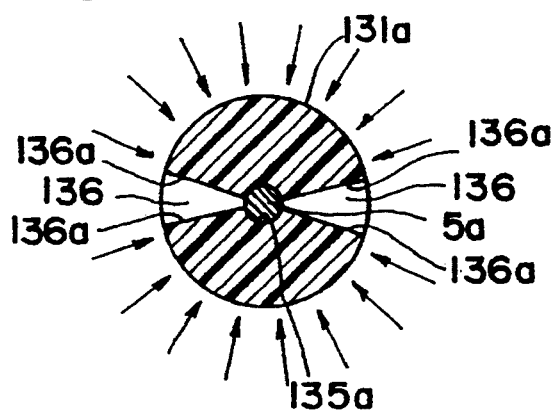
FIG. 17A is a cross-sectional view taken along line 17A—17A of FIG. 15.
Figure 17B:
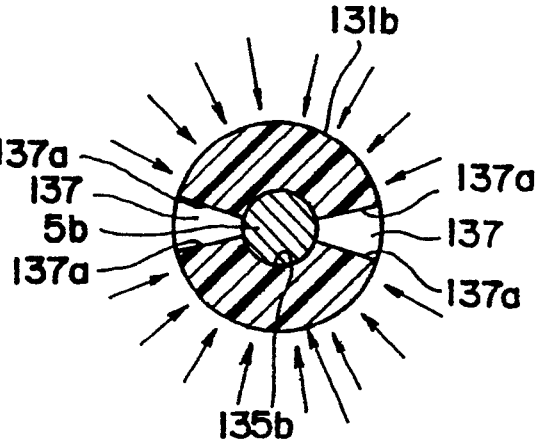
FIG. 17B is a cross-sectional view taken along line 17B—17B of FIG. 15.

As illustrated by FIGS. 13 and 14, the ferrule assembly 1 can be assembled with a two-way connector housing 120. The housing 120 comprises main housing body or base 121 and a cover housing part 122. A front end of the housing body 121 is formed with two, connector receiving, front opening, sockets 121a into which the ferrule 1 protrudes when assembled within the main housing body. During the assembly of the ferrule 1 into the main housing body, a forwardly facing surface provided by a stepped part at a rear end of the outer ferrule is brought into abutment with the periphery of the rim of the insertion opening and maintained there against by a biassing spring 123 trapped between the rear end of the ferrule and an inner wall of the main housing body, the spring also accommodating limited depression of the ferrule on mating. The optical fibers 5 extending from two ferrule assemblies mounted in the main housing body are dressed rearwardly to extend along the power cable 125 which is fixed in a rear end part of the main housing body 121.

The cover part 122 is assembled with the main housing body by a screw member 126 and includes a forwardly extending, resilient, hook-form coupling member which is located between the forwardly extending sockets 121a when the cover housing is assembled fully with the main housing body. The coupling member 122a locks the connector housing to a complimentary housing (not shown) with a snap action on assembly therewith while the resiliency of the spring members 123 enables the contact force between the connecting ferrules of the two housings to be automatically adjustable to a suitable valuable to ensure effective connection.

In another embodiment, shown in FIGS. 15a to 18, the ferrule assembly 12 includes an outer ferrule sleeve 21 molded of plastic and formed with an optical fiber receiving through-bore 12b and receiving a reinforcing sleeve in a similar fashion to the first example. However, the inner ferrule is molded in one piece as a single, cylindrical body having a clamping or insertion portion 131 formed with axially spaced clamping sections 131a and 131b for the bare fiber and sheath of the optical fiber, respectively, and which are of increased diameter, providing radially outwardly protruding interference surfaces and are joined to imperforate tubular portions of reduced diameter 131e, 131c, and 131d respectively, joining the rearmost clamping section to a locating or mounting portion 132 of enlarged diameter joining end portion 133; joining the clamping sections together and formed at a mating end of the inner ferrule, respectively. The body wall is formed with two axially spaced apart slits 136 and 137 extending through diametrically opposite wall portions of bare fiber clamping and sheath clamping sections 131a and 131b, respectively. An optical fiber receiving passageway extends axially along the ferrule having a forward bare optical fiber receiving section 135a from which a sheath receiving section 135b extends rearwardly.

As shown more particularly in FIGS. 18a and 18b, the opposed surfaces 136a and 137a of the respective slits 136 and 137 diverge as they radially outwardly from the passageway.

Figure 18:
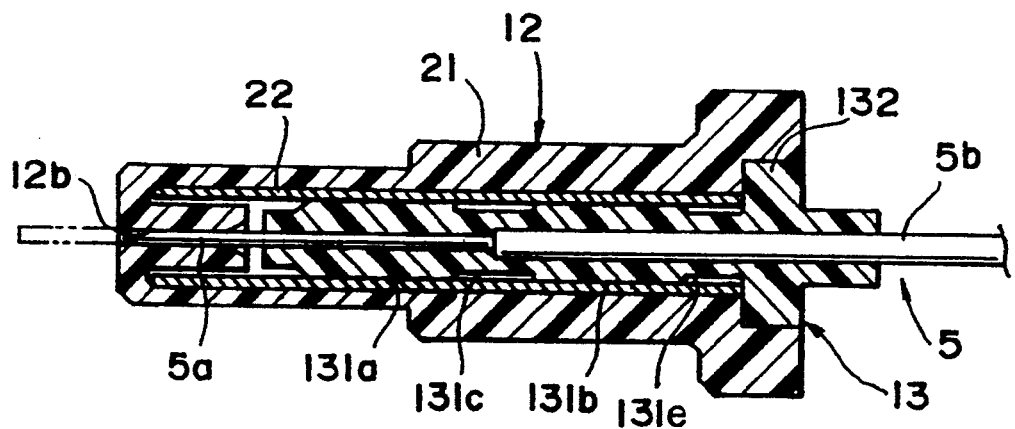
FIG. 18 is a cross-sectional view taken along a longitudinal axis of a ferrule assembly including the inner ferrule of FIG. 15.
Figure 19A:
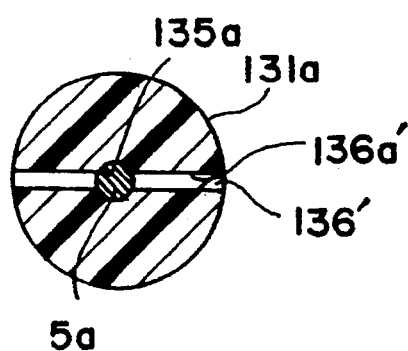
FIGS. 19A and 19B are transverse cross-sectional views taken along lines corresponding to 17A—17A and 17B—17B, respectively, of FIG. 15 but showing a modification; and, FIG. 20 is a cross-sectional taken view taken along a longitudinal axis of a further example of ferrule assembly incorporating the inner ferrule of FIG. 15.
Figure 19B:
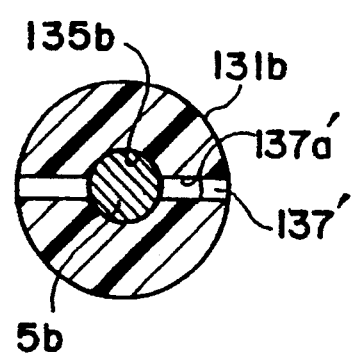

As shown particularly in FIG. 18, when the subassembly of the optical fiber 5 and the inner ferrule is force-fitted into the reinforcing sleeve, radial clearance remains between the reinforcing tube and the portions of reduced diameter 131c and 131e while outer surfaces of the clamping sections 131a and 131b form a tight interference or force-fit with the inner surface of the reinforcing tube. As in the earlier examples, as the surfaces 136a and 137a of the slits 136 and 137 remain spaced apart, the entire clamping force is applied to the bare fiber and sheath of the optical fiber, assuring reliable retention in the ferrule assembly.

An advantage of this embodiment is ease of handling, as the inner ferrule as only a single piece, avoiding manipulation of separate or hinged parts. The optical bare fiber and sheath are gripped only in discrete predetermined areas with the transition region between the sheath and bare fiber being relatively free from compressive force.

Figure 20:
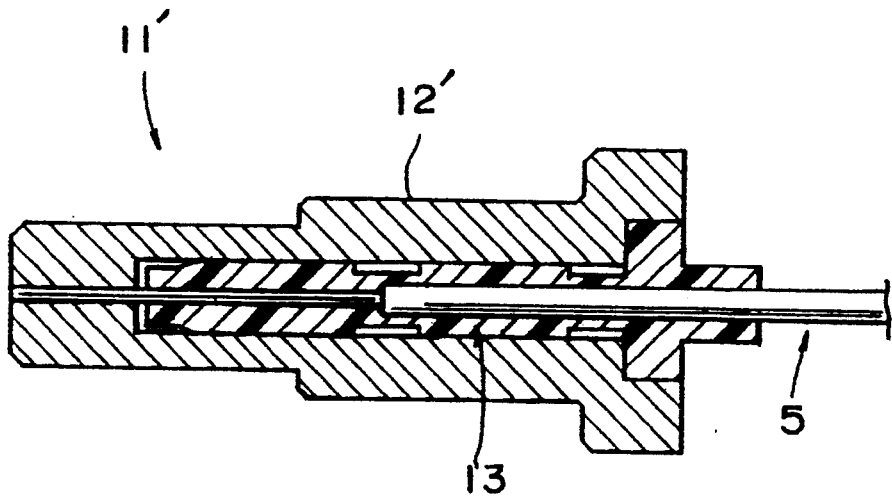
Figure 22:
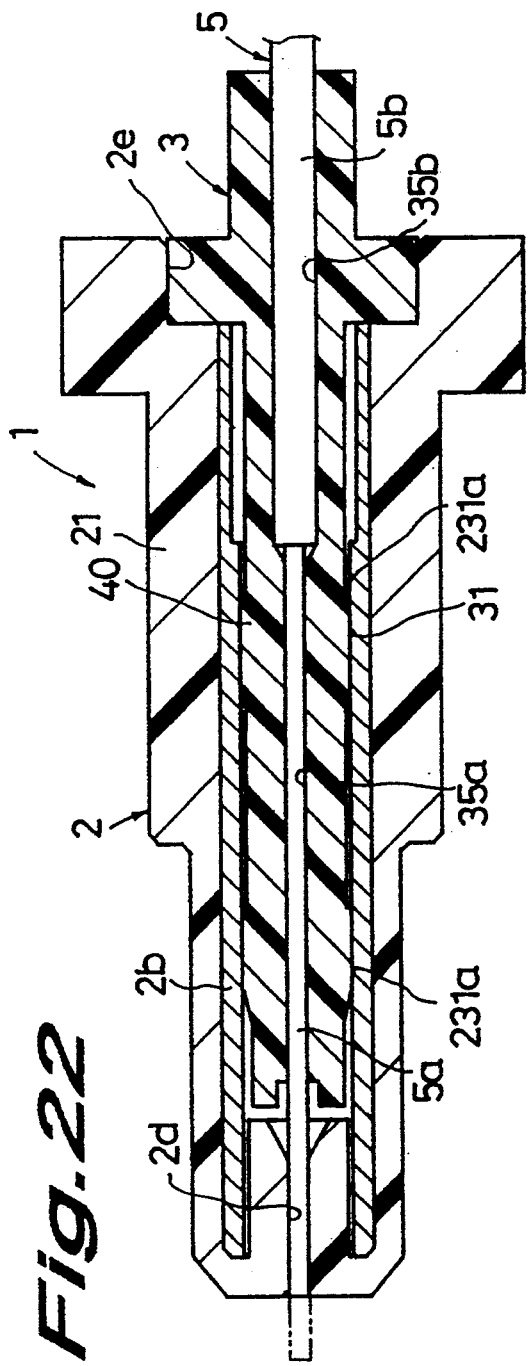
FIG. 22 is a cross sectional view taken along a longitudinal axis of another embodiment of ferrule assembly including the inner ferrule of FIG. 21A.
Figure 23:
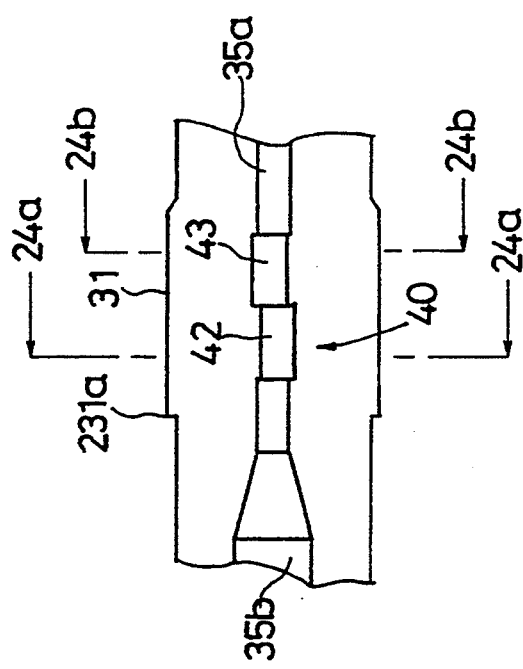
FIG. 23 is an enlarged fragmentary plan view of a retaining section of the inner ferrule of FIG. 21A; and, FIGS. 24A and 24B are transverse cross-sectional views corresponding to those taken along lines 24A and 24B in FIG. 23 with the inner ferrule halves folded together in clamping engagement with an optical fiber.

In an alternative version, shown in FIGS. 20a and 20b, the opposed surfaces 136a' and 137a' are not divergent but spaced apart in parallel relation.

As shown in FIG. 21 the ferrule assembly 11' includes a ferrule 12' made in one piece of metal obviating a need to manipulate and preassemble a metal reinforcing sleeve.

The additional embodiment of ferrule assembly shown in FIGS. 21A–24B is similar in many respects to that of the first and other previous examples and similar reference numerals have been used to designate similar parts. However, the optical fiber receiving grooves 35a of each clamping half 31 and 32 of the inner ferrule include retaining sections 40, 40' in which the bare fiber receiving groove includes two axially contiguous, discrete bare fiber clamping sections 42, 43 and 42',43', respectively, which are staggered or axially non-aligned both with each other and with the central axis of the remainder of the optical fiber receiving groove. The central axes of contiguous sections 42 and 43 in clamping half 31 are laterally displaced by the same amounts, in opposite directions from each other to respective opposite sides of the central axes of the remainder of groove 35a, as are the central axes of contiguous sections 42' and 43' in clamping half 32, but the respective directions of the displacement of the corresponding sections 42,42' and 43,43' which are brought into opposition when the ferrule halves are folded together about the fiber, are opposite to each other so that the axis of section 42, will be misaligned or displaced laterally from the axis of overlying section 42' by the maximum amount which will be twice the individual displacements of the axes of sections 42 and 42' from the central axis of the groove 35a.

Figure 24A:
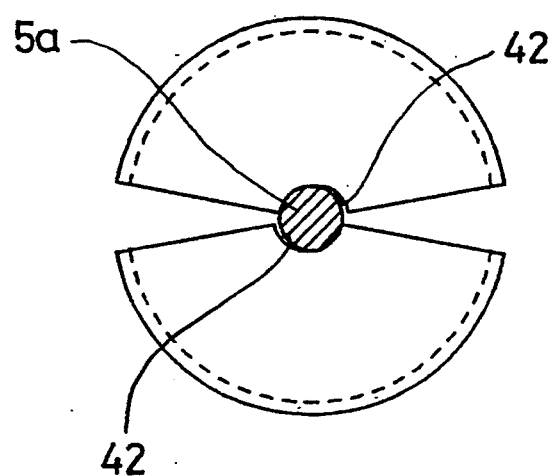
Figure 24B:
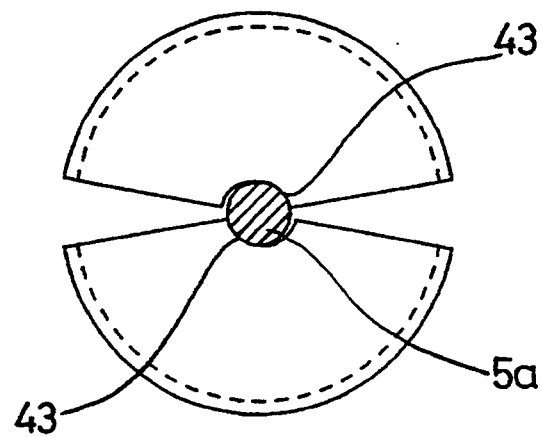

This results in the opposite sides of the bare fiber 5a being pressed in opposite directions within each section, with the directions being reversed in the adjacent contiguous section, as shown in FIGS. 24A and 24B, the longitudinal edges or lips of the groove sections bighting into or indenting the optical cladding of the bare fiber slightly with sharply defined shoulder-like corners at the transitions between each section also exerting great pressure on the optical cladding.

This produces somewhat sinuous deformations of opposite sides of the cladding, 180 degrees out of phase from each other, and a high optical fiber clamping force which ensures that the fiber will be retained in the inner ferrule without any axial movement relative thereto in spite of any thermal expansion or contraction of the inner ferrule axially along the metal tube, thereby reducing or eliminating a risk of "pistoning," (axial reciprocation of the bare fiber relatively along the inner ferrule), in which the tip of the optical fiber could protrude from the mating end of the ferrule assembly. At the same time the optical fiber core remains relatively straight, assuring retention of the optical transmitting properties thereof. The clamping force is accentuated by the increased diameter of interference portions 231a of the inner ferrule surrounding the retaining section 40 which expand against the inner wall of the metal tube when the temperature is raised providing an increased compression force to improve fiber retention.

We claim:

1. A ferrule assembly for terminating an optical fiber comprising:

an outer ferrule comprising a tubular body wall having front, mating and rear, optical fiber receiving axial ends;

an inner optical fiber clamping ferrule comprising a tubular body having a front, axial end and a rearwardly extending optical fiber clamping portion for receipt in the outer ferrule and defining an axially extending through-passageway, an axial slit extending through the clamping portion dividing the passageway into two opposed groove portions so that a prepared end of an optical fiber can be located in the groove portions extending along the through-passageway and the inner ferrule subsequently force-fitted within the outer ferrule to extend co-axially therewith, wall portions of the inner ferrule body at opposite axial ends of the slit maintaining axially extending portions of both respective opposed surfaces of the slit spaced apart from each other with the slit in open condition so that opposed walls of the groove portions are pressed into gripping engagement with the optical fiber therein by the receipt of the inner ferrule in the outer ferrule retaining the optical fiber centered accurately in the ferrule assembly.

2. A ferrule assembly according to claim 1 in which the spaced apart, opposed slit surfaces diverge as they extend radially outwardly away from the groove portions.

3. A ferrule assembly according to claim 2 in which the inner ferrule is cylindrical and said clamping portions are fan-shaped in transverse cross-section in the region of the open slit.

4. A ferrule assembly according to claim 1 in which the slit extends through diametrically opposite locations of the clamping portion.

5. A ferrule assembly for terminating an optical fiber comprising:

an outer ferrule comprising a tubular body wall having front, mating and rear, optical fiber receiving axial ends;

an inner optical fiber clamping ferrule made of plastic material and comprising a tubular body having a front, axial end and a rearward extending optical fiber clamping portion for receipt in the outer ferrule and defining an axially extending through-passageway, an axial slit extending through the clamping portion dividing the body into a pair of optical fiber clamping halves integrally joined together by web hinges extending from the front ends on respective opposite sides of the through-passageway, and dividing the passageway into two opposed groove portions, each clamping half being formed with one of the groove portions so that a prepared end of an optical fiber can be located in the groove portions extending along the through-passageway and the inner ferrule subsequently force-fitted within the outer ferrule to extend co-axially therewith, wall portions of the inner ferrule body at opposite axial ends of the slit maintaining axially extending portions of opposed surfaces of the slit spaced apart from each other with the slit in open condition so that opposed walls of the groove portions are pressed into gripping engagement with the optical fiber therein by the receipt of the inner ferrule in the outer ferrule retaining the optical fiber centered accurately in the ferrule assembly.

6. A ferrule assembly according to claim 5 in which respective clamping halves are provided with mating lugs and sockets, interengagable on positioning the clamping halves together with the respective slit surfaces in face-to-face relation, thereby maintaining the respective groove portions accurately aligned with each other.

7. A ferrule assembly for terminating an optical fiber comprising:

an outer ferrule comprising a tubular body wall having front, mating and rear, optical fiber receiving axial ends;

an inner optical fiber clamping ferrule comprising a tubular body having a front, axial end and a rearward extending optical fiber clamping portion for receipt in the outer ferrule, and defining an axially extending through-passageway, the clamping portion being formed with two axially spaced clamping sections for clamping a bare optical fiber and sheath, respectively, and being of increased diameters providing radially outwardly protruding interference portions forming interference fits within the outer ferrule, two axially extending slits located in longitudinal spaced apart relation extending through opposite sides of the clamping portion in respective clamping sections dividing the passageway into two opposed groove portions so that a prepared end of an optical fiber can be located in the groove portions extending along the through-passageway and the inner ferrule subsequently force-fitted within the outer ferrule to extend co-axially therewith, wall portions of the inner ferrule body at respective opposite axial ends of each slit maintaining axially extending portions of opposed surfaces of each slit spaced apart from each other with the slit in open condition so that opposed walls of the groove portions of the respective clamping sections are pressed into gripping engagement with the bare optical fiber and sheath therein, respectively, by the receipt of the inner ferrule in the outer ferrule, retaining the optical fiber centered accurately in the ferrule assembly.

8. A ferrule assembly according to claim 7 in which the wall portions are imperforate.

9. A ferrule assembly according to claim 7 in which the spaced apart, opposed slit surfaces diverge as they extend radially outwardly away from the groove portions.

10. A ferrule assembly according to claim 1 in which the outer ferrule comprises an outer sleeve formed as a single piece of plastic material and a rigid, reinforcing tube received in the outer sleeve in co-axial relation therewith as a force fit forming a sub-assembly, the inner ferrule forming the force fit with the reinforcing tube.

11. A ferrule assembly according to claim 2 in which the outer ferrule comprises an outer sleeve formed as a single piece of plastic material and a rigid, reinforcing tube received in the outer sleeve in co-axial relation therewith as a force fit forming a sub-assembly, the inner ferrule forming the force fit with the reinforcing tube.

12. A ferrule assembly according to claim 1 in which the outer ferrule comprises an outer sleeve formed as a single piece of plastic material and a rigid, reinforcing tube received in the outer sleeve in co-axial relation therewith as a force fit forming a sub-assembly, the inner ferrule forming the force fit with the reinforcing tube.

13. A ferrule assembly according to claim 7 in which the outer ferrule comprises an outer sleeve formed as a single piece of plastic material and a rigid, reinforcing tube received in the outer sleeve in co-axial relation therewith as a force fit forming a sub-assembly, the inner ferrule forming the force fit with the reinforcing tube.

14. A ferrule assembly according to claim 9 in which in which the outer ferrule comprises an outer sleeve formed as a single piece of plastic material and a rigid, reinforcing tube received in the outer sleeve in co-axial relation therewith as a force fit forming a sub-assembly, the inner ferrule forming the force fit with the reinforcing tube.

15. A ferrule assembly according to claim 7 in which the radially protruding interference portions are axially joined at respective opposite axial ends by body wall portions of reduced diameter radially spaced apart from the outer ferrule.

16. A ferrule assembly according to claim 13 in which the radially protruding interference portions are axially joined on respective opposite axial ends by body wall portions of reduced diameter radially spaced apart from the reinforcing tube of the outer ferrule.

17. A ferrule assembly according to claim 16 in which the clamping sections are joined together axially by an imperforate body wall portion.

18. A ferrule assembly for terminating an optical fiber comprising:
an outer ferrule comprising a tubular body wall having front, mating and rear, optical fiber receiving axial ends;
an inner optical fiber clamping ferrule comprising a tubular body having a front, axial end and a rearward extending optical fiber clamping portion for receipt in the outer ferrule and defining an axially extending through-passageway, an axial slit extending through the clamping portion dividing the body into a pair of optical fiber clamping parts and dividing the passageway into two opposed groove portions, each clamping part being formed with one of the groove portions so that a prepared end of an optical fiber can be located in the groove portions extending along the through-passageway and the inner ferrule subsequently force-fitted within the outer ferrule to extend co-axially therewith, and so that opposed walls of the groove portions are pressed into gripping engagement with the optical fiber therein by the receipt of the inner ferrule in the outer ferrule retaining the optical fiber centered accurately in the ferrule assembly, at least one axially extending, fiber retaining section of a groove portion of a clamping part being non-aligned axially both with a remainder of the groove portion of the clamping part in which it is formed and with a fiber retaining section of the groove portion of the other clamping part so that the respective axes of the fiber retaining sections are laterally displaced, and so that, when opposed walls of the groove portions are pressed into gripping engagement with the optical fiber with the fiber retaining sections in opposed overlying relation, longitudinal edges of the fiber retaining sections of respective clamping parts will press opposite sides of optical cladding of the fiber in opposite lateral directions thereby restraining axial movement of the fiber relative to the inner ferrule.

19. A ferrule assembly according to claim 18 in which the respective axes of the fiber retaining sections are laterally displaced in respective opposite directions from each other to respective opposite sides of the axes of the remainders of groove portions with which they are contiguous.

20. A ferrule assembly according to claim 19 in which there are a plurality of contiguous fiber retaining sections in each clamping part laterally displaced in respective opposite directions from each other to respective opposite sides of the axes of the remainders of groove portions with which they are contiguous.

21. A ferrule assembly according to claim 1 in which at least one axially extending, fiber retaining section of a groove portion is non-aligned axially both with a remainder of the groove portion of the clamping part in which it is formed and with a fiber retaining section of the other groove part so that the respective axes of the fiber retaining sections are laterally displaced and so that, when opposed walls of the groove portions are pressed into gripping engagement with the optical fiber with the fiber retaining sections in opposed overlying relation, longitudinal edges of the fiber retaining sections of respective groove portions will press opposite sides of optical cladding of the fiber in opposite lateral directions thereby restraining axial movement of the fiber relative to the inner ferrule.

22. A ferrule assembly according to claim 21 in which the respective axes of the fiber retaining sections are laterally displaced in respective opposite directions from each other to respective opposite sides of the axes of the remainders of groove portions with which they are contiguous.

23. A ferrule assembly according to claim 22 in which there are a plurality of contiguous fiber retaining sections in each clamping portion which are laterally displaced in respective opposite directions from each other to respective opposite sides of the axes of the remainders of groove portions with which they are contiguous.

24. A ferrule assembly according to claim 5 in which at least one axially extending, fiber retaining section of a groove portion of a clamping half is non-aligned axially both with a remainder of the groove portion of the clamping half in which it is formed and with a fiber retaining section of the groove portion of the other clamping half so that the respective axes of the fiber retaining sections are laterally displaced and so that, when opposed walls of the groove portions are pressed into gripping engagement with the optical fiber with the fiber retaining sections in opposed overlying relation, longitudinal edges of the fiber retaining sections of respective clamping portions will press opposite sides of optical cladding of the fiber in opposite lateral directions thereby restraining axial movement of the fiber relative to the inner ferrule.

25. A ferrule assembly according to claim 24 in which the respective axes of the fiber retaining sections are laterally displaced in respective opposite directions from each other to respective opposite sides of the axes of the remainders of groove portions with which they are contiguous.

26. A ferrule assembly according to claim 25 in which there are a plurality of contiguous fiber retaining sections in each clamping portion laterally displaced in respective opposite directions from each other to respective opposite sides of the axes of the remainders of groove portions with which they are contiguous.

27. A ferrule assembly according to claim 7 in which at least one axially extending, fiber retaining section of a groove portion of a clamping section is non-aligned axially both with a remainder of the groove portion of the clamping section in which it is formed and with a fiber retaining section of the opposed groove portion so that the respective axes of the fiber retaining sections are laterally displaced and so that, when opposed walls of the groove portions of the clamping section are pressed into gripping engagement with the optical fiber, longitudinal edges of the fiber retaining sections of respective clamping portions will press opposite sides of optical cladding of the fiber in opposite lateral directions thereby restraining axial movement of the fiber relative to the inner ferrule.

28. A ferrule assembly according to claim 27 in which the respective axes of the fiber retaining sections are laterally displaced in respective opposite directions from each other to respective opposite sides of the axes of the remainders of groove portions with which they are contiguous.

29. A ferrule assembly according to claim 28 in which there are a plurality of contiguous fiber retaining sections in each clamping portion which are laterally displaced in respective opposite directions from each other to respective opposite sides of the axes of the remainders of groove portions with which they are contiguous.

* * * * *